(12) United States Patent
Adams et al.

(10) Patent No.: US 6,487,646 B1
(45) Date of Patent: Nov. 26, 2002

(54) APPARATUS AND METHOD CAPABLE OF RESTRICTING ACCESS TO A DATA STORAGE DEVICE

(75) Inventors: Donald Adams, Pleasanton, CA (US); David Chandler Platt, Mountain View, CA (US); Tain-Shain Lee, San Jose, CA (US); Stephen Lacey, Mountain View, CA (US)

(73) Assignees: Maxtor Corporation, Longmont, CO (US); TiVo, Inc., Sunnyvale, CA (US)

( * ) Notice: Subject to any disclaimer, the term of this patent is extended or adjusted under 35 U.S.C. 154(b) by 0 days.

(21) Appl. No.: 09/515,408

(22) Filed: Feb. 29, 2000

(51) Int. Cl.[7] ............................................... G06F 12/00
(52) U.S. Cl. ..................... 711/163; 711/164; 713/200
(58) Field of Search ........................... 711/163; 713/202

(56) References Cited

U.S. PATENT DOCUMENTS

| | | | | |
|---|---|---|---|---|
| 5,375,243 A | * | 12/1994 | Parzych et al. | 380/52 |
| 5,483,649 A | * | 1/1996 | Kuznetsov et al. | 713/200 |
| 5,838,793 A | | 11/1998 | Lewis | 380/25 |
| 6,012,145 A | * | 1/2000 | Mathers et al. | 711/164 |
| 6,012,146 A | * | 1/2000 | Liebenow | 713/202 |
| 6,122,716 A | * | 9/2000 | Combs | 365/185.04 |
| 6,145,053 A | * | 11/2000 | Smith | 360/75 |
| 6,195,732 B1 | | 2/2001 | Adams et al. | 711/156 |
| 2002/0099950 A1 | * | 7/2002 | Smith | 713/200 |

* cited by examiner

Primary Examiner—Reba I. Elmore
(74) Attorney, Agent, or Firm—David M. Sigmond

(57) ABSTRACT

The present invention is related to a data storage device capable of restricting access to data storage or retrieval when a first code is incompatible with a second code. The data storage device comprises (a) a data storage media having a data storage region; and (b) a controller adapted to compare a first code with a second code and to restrict access to a portion of the data storage region of the data storage device if the first code is incompatible with the second code.

90 Claims, 3 Drawing Sheets

APPARATUS AND METHOD CAPABLE OF RESTRICTING ACCESS TO A DATA STORAGE DEVICE

BACKGROUND

The present invention relates to an apparatus and method capable of restricting access to a data storage device.

There are a variety of reasons why it may be desirable to restrict access to the storage or retrieval of data on a data storage device. First, it may be desirable to restrict access to data stored on the data storage device. For example, theft of the data storage device can lead to the theft of trade-secret and copyrighted data or software stored in the data storage device. Trade-secret data derives its value from its secrecy. Copyrighted software is often licensed with the condition that the software may be used only within a specific product or computer in which it was sold. When a data storage device that contains copyrighted software or trade-secrets is stolen, the unauthorized use, reproduction and distribution of the software or data would result in economic harm to the owner of the software or data.

Another problem arises from the widespread theft of data storage devices from purchased or leased computers. Purchased computers are often stolen and their components sold as spare parts. In leased computers, the data storage device can be replaced with an inferior data storage device without the knowledge of the lessor. Because it is easy to remove peripheral devices such as disk drives from the external computer system and to use the devices in other machines, there is a large market for stolen disk drives. Thus, it is desirable to prevent or limit use of a data storage device when it is removed from one computer or other apparatus for use in another computer or device.

Another reason is that data storage devices are often sold to original equipment manufacturers (OEM) at lower subsidized prices in order for the OEM'to manufacture and sell a product at a competitive price. However, an unscrupulous merchant can take advantage of the lower OEM price by buying the product, removing the data storage device from the product, and using the device in a different machine or selling the device on the open market. Also, the removed data storage device could be sold to a consumer without disclosing that the data storage device is being resold or is a re-manufactured unit, thereby deceiving the consumer.

Thus it is desirable to limit functioning of a data storage device to a specific product or computer system. Restricting access to a data storage region of the data storage device discourages potential thefts of data storage devices and prevents the unauthorized use, reproduction and distribution of copyrighted software and trade secret data.

SUMMARY

The present invention is directed to a data storage device, a computer system and a method for restricting a computer'access to a portion of a data storage region of a data storage device so that the data storage device can be used effectively only on a specific computer or a specific apparatus that contains a computer to deter theft or other unlawful use of the data storage device.

The present data storage device invention comprises a controller and a data storage media having a data storage region thereon. The controller is adapted to compare a first code with a second code. If the first code is incompatible with the second code, the controller is adapted to restrict access to a portion of the data storage region of the data storage device. Otherwise, the controller provides access to substantially all of the data storage region of the data storage device.

The present computer system invention comprises a data storage media, a master module, and a controller. The data storage media has a key storage area adapted to store a first code and a second code, and a data storage region to receive and store data. The master module comprises program code to retrieve a first code and perform a function adapted to generate a comparison value from the first code. The controller is adapted to compare the comparison value to the second code and to restrict access to a portion of the data storage region of the data storage device if the comparison value is incompatible with the second code.

The present invention also provides a method of restricting access of a computer to a portion of a data storage region of a data storage device. The method comprises the steps of obtaining a first code and a second code from one or more of the data storage device or an external system and comparing the first code to the second code. The method further includes the step of restricting access to a portion of a data storage region of the data storage device if the first code is incompatible with the second code. Otherwise, substantially all of the data storage region of the data storage device is accessible.

Thus this invention prevents theft of data storage devices by preventing access to a portion of the data storage region of data storage devices. The incentive to steal data storage devices with restricted access to a portion of its data storage region is lessened. In addition, if trade secret data or copyrighted software is stored in the portion of the data storage region, the potential for unauthorized use, reproduction and distribution of the trade secret data or the copyrighted software is lessened.

DRAWINGS

These and other features, aspects, and advantages of the present invention will become better understood with reference to the following description and appended claims where:

DESCRIPTION

Figure 1:
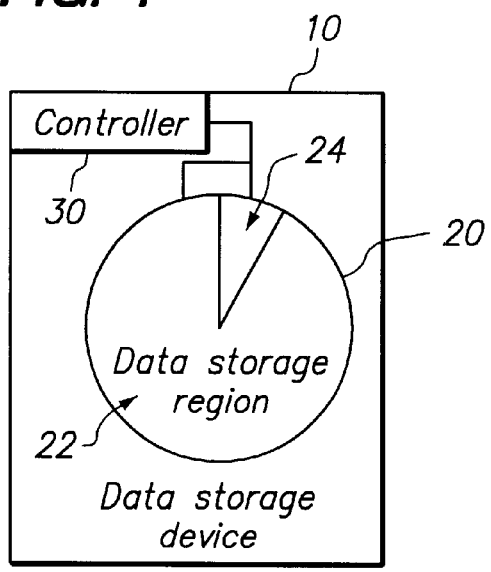
FIG. 1 shows an embodiment of a data storage device according to the present invention.
Figure 2:
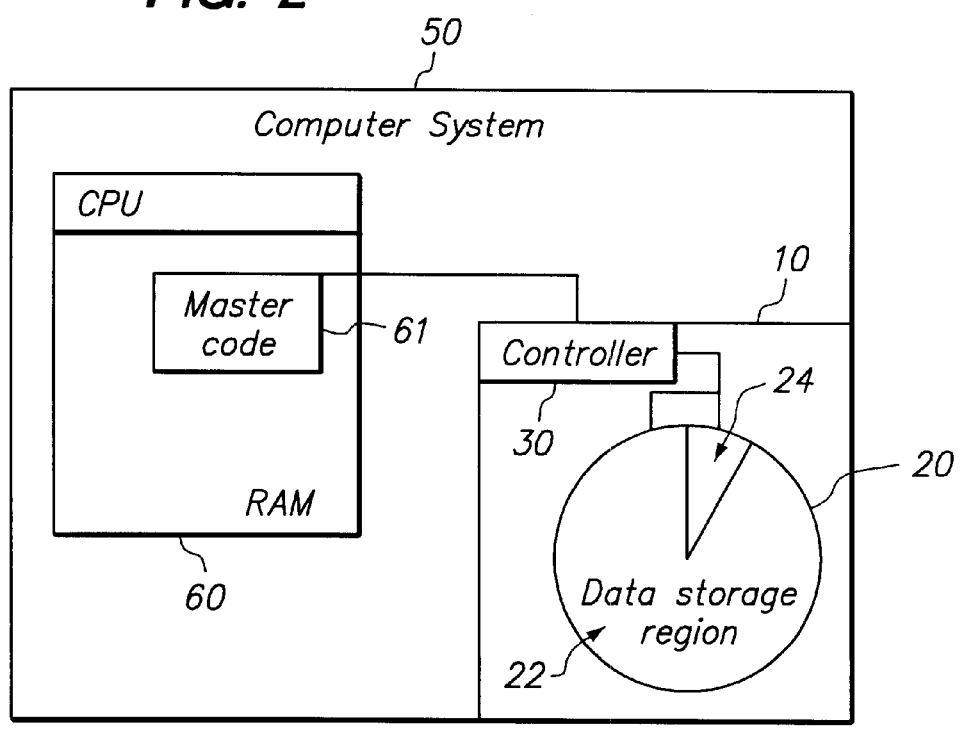
FIG. 2 shows an embodiment of an external system according to the present invention, the external system comprising a data storage device.

FIG. 1 shows a block diagram of a data storage device 10 that illustrates the principles of the present invention. The data storage device 10 is non-volatile memory storage device, such as a disk drive, tape drive or flash card, that is capable of storing digital data. FIG. 1 illustrates an exemplary data storage device 10 comprising a data storage media 20 having a data storage region 22. An embedded controller 30 is provided to operate the data storage device 10. The controller 30 controls operation of coupled read/write heads and data storage media 20 to read and write data onto each media surface of the data storage media 20. The controller 30 comprises application specific integrated circuit chips in an electronic circuit, and also has embedded or system software comprising programming code that monitors and operates a computer 60 or other external system. The computer 60 is a computational apparatus, and as illustrated in FIG. 2, may comprise a central processor unit (CPU) with one or more microprocessors, random access memory (RAM) modules, various Input/Output (I/O) controller cards, a display such as a monitor, and a keyboard and mouse for inputting data. The data storage devices 10 are provided for storage and retrieval of data. Operating system (OS) software in the Read Only Memory (ROM) controls the computer by means of the microprocessor, modular device (MDD) software and basic input/output software (BIOS) provide access to the controller 30 of the data storage device 10. A communications bus provides a pathway through which the computer 60 can communicate with the controller 30 of the data storage device 10, to exchange data, commands and responses according to an agreed-upon protocol. Industry standard buses such as SCSI, IDE/ATA, and FireWire are examples of such buses.

In one version of the present invention, a certain amount of non-volatile memory, such as a first portion of a media surface of the data storage media 20 in the data storage device 10, is reserved for internal use by the embedded controller 30; and a larger second portion of the data storage media 20, the data storage region 22, is available for data storage and retrieval by the computer 60. Instead of being stored on a media surface, internal use data storage can also be accomplished on a Flash or Programmable Read Only Memory chip, or other such data storage means. The data storage device 10 further comprises a key storage area 24 usually within the first reserved portion of the data storage media 20, the key storage area 24 adapted to store at least one of a first and second code therein. The first and second codes each comprise a sequence of digital signals which can be alphabetic, alpha-numeric or numeric. They comprise a number of bytes of information and typically contain from about 8 to about 16 bytes. Preferably, the key storage area 24 is capable of storing a large number of first and second codes, and more preferably at least 64 pairs of first and second codes as provided below. The large number of first and second codes reduce the likelihood of penetration or discovery of the codes by an unauthorized operator as explained herein.

A security checking program code partially stored in the memory of the computer 60 and partially residing in the memory of the controller 30 performs the security checking steps and also allows an authorized operator the ability to change or input the values of the codes used for the security checking operation. The security checking program code contains instructions to query the controller 30 of the data storage device 10 upon start-up, retrieving one or more values of stored codes from a predetermined location in the memory of the controller 30, manipulating the retrieved code values to determine other challenge or comparison values using a preset code or mathematical function, comparing one or more of the retrieved or calculated code values, and controlling access to the data storage media 20 of the data storage device 10 from the external computer system.

The controller 30 supports a command from the security checking program code through which the computer 60 can determine the size of the available larger second portion of the data storage media 20. The security checking program code queries the controller 30 of the data storage device 10 upon start-up to determine if the data storage device 10 is powered. Thereafter the security checking program code retrieves one or more values of stored and calculated codes from predetermined locations and compares the codes to determine if the codes are compatible. If a pair of codes are compatible, by which it is meant that the two codes satisfy a predetermined one-to-one relationship with one another, the controller 30 provides access to the entire data storage portion of the data storage media 20. However, if the two codes are incompatible, by which it is meant that the two codes do not satisfy the predetermined one-to-one relationship with one another, the controller 30 will proceed to restrict access to a portion of the data storage region 22 of the data storage device 10, and optionally, will also continue to reject requests for access to that portion of the data storage media 20. If the first and second codes are incompatible, the controller 30 can also be further adapted to deny the existence of the inaccessible portion of the data storage region 22 of the data storage device 10 to queries regarding the size of the region 22.

The controller 30 may also be adapted to perform other tasks. For example, the controller 30 may be further adapted to restrict access to a portion of the data storage region 22 upon disconnection of the device 10 from an external system. In addition, the controller 30 can be further adapted to count the number of times that the controller 30 compares the first code with the second code. If the count exceeds a preset limit, the controller 30 is further adapted to restrict access to the portion of the data storage region 22 of the data storage device 10. In addition, the controller 30 may be further adapted to restrict access to only a portion of the data storage region 22 upon disconnecting the data storage device 10 from the external computer system. If access to the portion of data storage region 22 of the data storage device 10 is denied, the device 10 or the controller 30 may include means to deny the existence of any and all inaccessible portions of the data storage region 22 of the data storage device 10.

In another version, the key storage area 24 contains a table comprising an array of first codes having a plurality of first values, and an array of second codes having a plurality of second values, wherein each first value has a one-to-one correspondence with a second value. In this embodiment, the program code may retrieve a value of the first code from the first code array at random and compare it with its corresponding value of the second code. Alternatively, the program code may initially retrieve a value of a first code from the first code array and compare the value to a corresponding second value from the second code array. Thereafter, the program code retrieves the next value from the first code array and compares it to its corresponding value in the second code array. Only if a certain number of, or all of the comparisons provide a successful outcome, will the controller 30 provide access to the data storage region 22 of the data storage device 10. Otherwise, the controller 30 restricts access to a portion or substantially all of the data storage region 22 of the data storage device 10.

In another version, a computer system 50 comprises a data storage media 20, a master module 61 and a controller 30. The data storage media 20 has a key storage area 24 adapted to store a first code and a second code and a data storage region 22 to receive and store data. The key storage area 24 may be inaccessible to an unauthorized operator. The master module 61 comprises program code to retrieve a first code and perform a function adapted to generate a comparison value from the first code. The master module 61 may also be inaccessible to an unauthorized operator. The controller 30 is adapted to compare the comparison value to the second code and to restrict access to a portion or substantially all of the data storage region 22 of the data storage device 10 if the comparison value is incompatible with the second code.

As FIG. 2 illustrates, the computer 60 includes a master module 61 comprising program code adapted to generate a challenge or comparison value from a retrieved first code. The master module 61 preferably comprises a one-way function, and optionally an identifier code, which is adapted to generate the comparison value from the first code. In this version, the first code and the second code are compatible if a comparison value derived from the first code is substantially similar to the second code. The one-way function, identifier code, or both may be unique to the computer 60. To enhance the security of the system 50, the master module 61, the one-way function and the identifier code are all maintained substantially secret by which it is meant that at least one of these items is maintained inaccessible without a key code from the device manufacturer. The key code is a secret value that is designated by the device manufacturer to allow only an authorized person such as the device manufacturer to gain access to the master module 61. In addition, the one-way function and identifier code can be encrypted to make it difficult or computationally expensive to determine these functions values.

The one-way function is a mathematical function that receives a first code as input and generates a second code as output. For a given first code, a one-way function always computes the same single deterministic value as output. Preferably, the one-way function uses the identifier code to generate the comparison value from the first code. The identifier code is, for example, an identifier code comprising an alphabetic, alpha-numeric, or numeric value, that is specifically assigned to a machine, owner of the computer, or an OEM. The identifier code can also be a random number generated by the computer. If the one-way function uses the identifier code, the function should have at least some degree of cryptographic strength. Cryptographic strength is proportional to the computational expense required for an unauthorized person to identify the identifier code if the unauthorized person knows only the first and second codes but not the identifier code. High cryptographic strength also means that computing a second code from a first code without the identifier code requires high computational expense. Operation of the one-way function and identifier code is explained herein.

Figure 3:
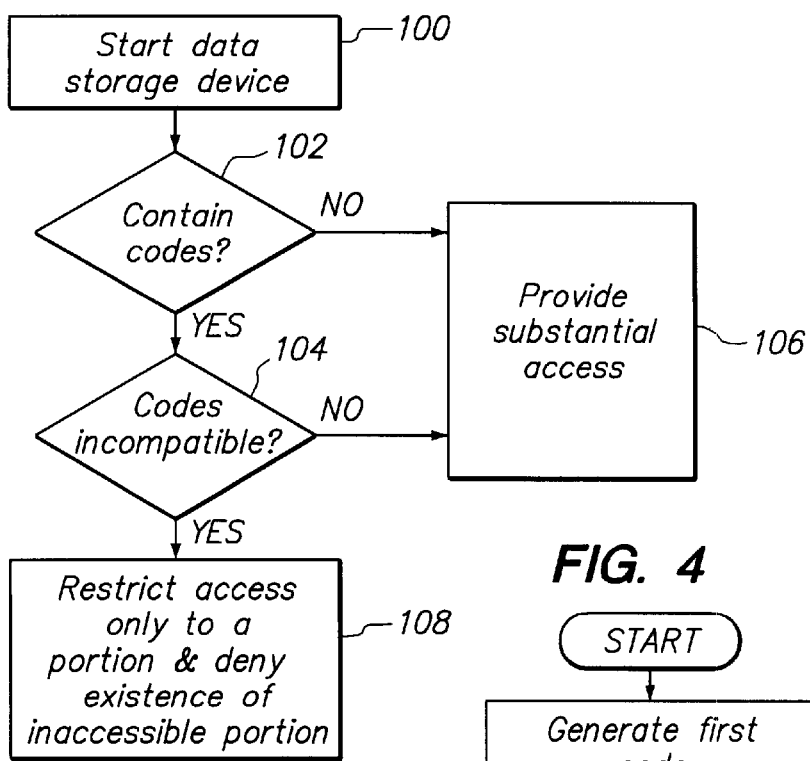
FIG. 3 shows a flow chart of a method of controlling access to a data storage device according to the present invention.

FIG. 3 shows a flow chart of an exemplary and preferred method of restricting access to the data storage device 10. Typically, a controller 30 of a data storage device 10 supports commands such as READ, WRITE, IDENTIFY DRIVE and READ CAPACITY. For the present invention, the controller 30 is modified to support additional commands such as: SET KEYS, REQUEST CHALLENGE, and UNLOCK DRIVE. One or more sectors of the data storage media 20 are reserved as a key storage area 24 to store at least one of a first code or a second code. Only the controller 30 is able to access, read and write to the key storage area 24. Optionally, one or more of the first and second codes are encrypted or hidden so that the hidden code is not readable by an external system or unauthorized operator without the key code. The controller 30 does not allow the external system or unauthorized operator to access the key storage area 24 via the READ or WRITE commands.

The method begins at start step 100 where the data storage device 10 is powered or started. In step 102, the controller 30 checks the state of key storage area 24 to determine whether the key storage area 24 contains both the first code and the second code. If not, then the controller 30 returns the true size of the data storage region 22 of the data storage device 10 when the command IDENTIFY DRIVE is invoked and permits READ and WRITE commands to access substantially all of the data storage region 22 of the data storage device 10 at step 106. If, however, the key storage area 24 contains both the first code and the second code, then the controller 30 compares the first and second codes at step 104. If the first and second codes are compatible, then the controller 30 returns the true size of the data storage region 22 of the data storage device 10 when the command IDENTIFY DRIVE is invoked and permits READ and WRITE commands to access substantially all of the data storage region 22 of the data storage device 10 at step 106. If the first and second codes are incompatible, then the controller 30 returns a reduced size of the data storage region 22 of the data storage device 10 when IDENTIFY DRIVE or READ CAPACITY is invoked, and permits READ and WRITE commands to access only the portion of the data storage region 22 corresponding to the reduced size at step 108. At step 108, the controller 30 also rejects any attempt to access the portions of the data storage region 22 not corresponding to the reduced size with an ILLEGAL ADDRESS error condition and thereby effectively denies the existence of any inaccessible portion of the data storage region 22 of the data storage device 10.

Figure 4:
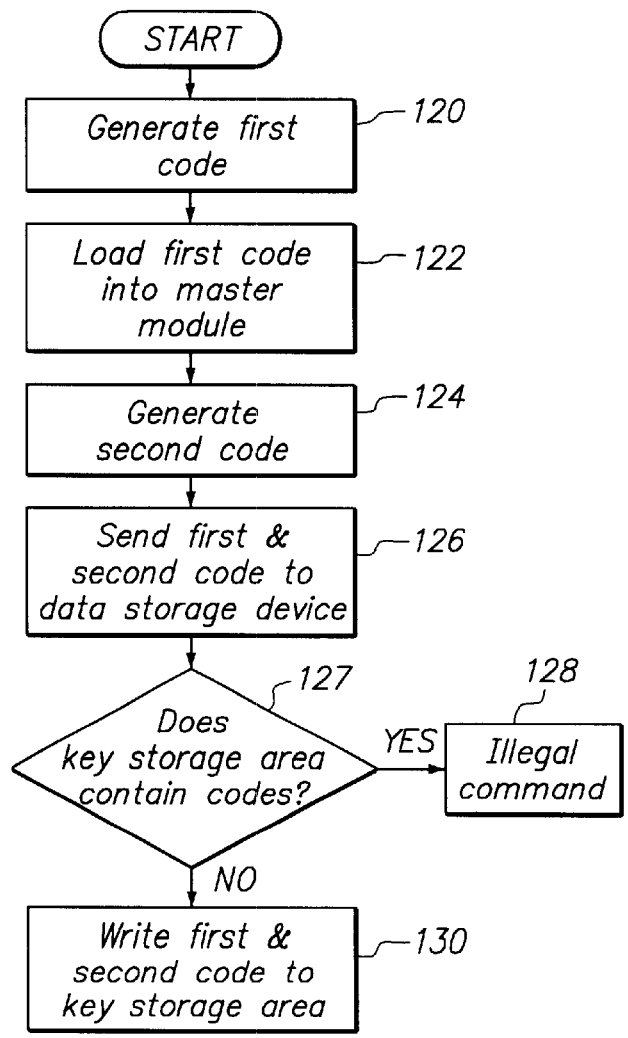
FIG. 4 shows a flow chart of a method of locking a data storage device according to the present invention.

FIG. 4 is an embodiment of the invention showing a flow diagram for locking the data storage device 10. Locking a data storage device restricts access to at least a portion of the data storage portion of the device. To lock the data storage device 10, a first code is generated at step 120, usually by a random number generator. The first code typically comprises an array of at least about 64 values, the large number of values reducing the likelihood of penetration or discovery of the codes by an unauthorized operator. The first code is loaded into the master module 61 at step 122. The master module 61 generates a second code from the first code at step 124 by loading each value of the first code and generating a corresponding second value for each value of the first code. The second code comprises the array of the corresponding second values. The first and second codes are combined into a table of pairs, and the table is sent to the data storage device 10 via the SET KEYS command at step 126. The controller 30 checks the state of the key storage area 24 at step 127. The state of the key storage area 24 may be indicated by a "valid" or "invalid" marking. If the key storage area 24 already contains codes, for example, the key storage area 24 is marked "valid", the controller 30 rejects the SET KEYS command with an "illegal command" error at step 128. Otherwise, the controller 30 writes the first and second codes into the key storage area 24 at step 130.

For example, in one implementation, the controller 30 sends a first value to the computer 60 which computes a second value for comparison and sends the second value back to the controller 30. The controller 30 compares the computed second value to a stored second value. Thus, the retrieval, calculation, and storage tasks are shared between the controller 30 and the computer 60. If the computer 60 sends an impostor signal, then the controller 30 will deny, or at least restrict, access to the data storage media 20.

Figure 5:
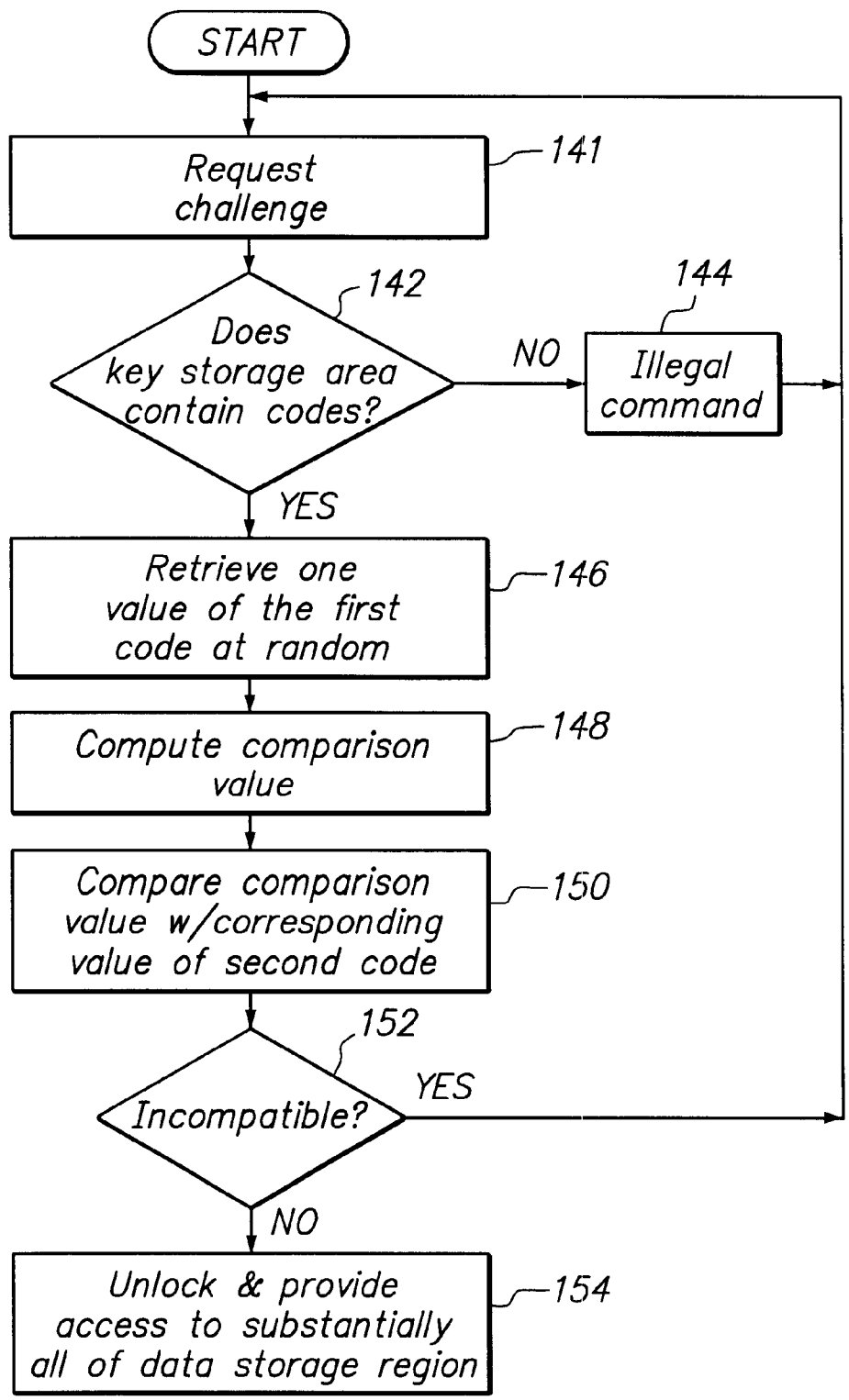
FIG. 5 shows a flow chart of a method of unlocking a data storage device according to the present invention.

FIG. 5 is a preferred embodiment of the invention showing a flow diagram for unlocking the data storage device 10. To unlock and gain the full capacity of the data storage device 10, the computer 60 sends a REQUEST CHALLENGE command to the data storage device 10 at step 141. If the key storage area 24 of the data storage device 10 lacks either a first or second code at step 142, the controller 30 rejects the command with an "illegal command" error at step 144. Otherwise, the controller 30 retrieves a value of the first code selected at random from the key storage area 24 and sends the value to the computer 60 at step 146. The computer 60 loads the value of the first code into its master module 61, and instructs the master module 61 to compute a comparison value using the value of the first code, the one-way function and the identifier code at step 148. The computer 60 then sends the comparison value to the data storage device 10 via an UNLOCK COMMAND. The controller 30 compares the comparison value with the value of the second code that corresponds to the value of the first code at step 150. If the comparison value is compatible with the value of the second code, e.g., if the two are the same, the controller 30 unlocks the drive and reports the successful completion of the UNLOCK DRIVE command at step 154.

In another embodiment, the present invention may further comprise means for monitoring the number of failed UNLOCK DRIVE commands. If the number of failed UNLOCK DRIVE commands exceeds a preset limit, e.g., three, the data storage device 10 can be designed to disable itself until it is reset, i.e., having its power turned off and on again. This embodiment would deter those who would repeatedly attempt to overcome the present invention.

In one exemplary embodiment, the data storage device 10 comprises a disk drive adapted to operate on a specific computer, and in which the controller 30 is adapted to restrict access to a portion of the data storage region 22 of the data storage device 10 upon removal of the disk drive from the specific computer. In this version, a machine-specific identifier code is programmed into the computer. Upon powering the computer 60 and disk drive, the program code retrieves a first value at random from a table comprising first and second code arrays that are preprogrammed into the drive controller 30. The first code array is an array of values that was originally a series of randomly generated numbers. The second code array is an array of values that resulted from processing the first code array with a machine-specific identifier code and an original one-way function. A one-way function stored in the computer 60 uses the identifier code to generate a comparison value from the retrieved first value. The comparison value is sent to the controller 30 and the controller 30 compares the comparison value with the value of the second code array that corresponds with the first value of the first code from which the comparison value is generated. If the comparison value and the value of the second code are incompatible, access to a portion of the data storage region 22 of the data storage device 10 is restricted. Otherwise, the computer 60 is provided access to substantially all of the data storage region 22.

The present invention has been described in considerable detail with reference to preferred versions that are provided only to illustrate the invention and should not be used to limit the scope of the invention. For example, the data storage device can store data on electronic devices; and the computer system can comprise systems and machines other than computers.

What is claimed is:

1. A data storage device comprising:
   (a) a data storage media having a data storage region; and
   (b) a controller adapted to provide a first code to an external system and to compare a comparison value derived from the first code by the external system with a second code and to restrict access to a portion of the data storage region of the data storage device if the comparison value is incompatible with the second code.

2. A data storage device according to claim 1 further comprising a key storage area adapted to store at least one of the first code or the second code, and wherein at least one the first code or the second code is retrieved from the key storage area.

3. A data storage device according to claim 2 comprising program code to perform the retrieve and comparison steps.

4. A data storage device according to claim 1 wherein the first code comprises a first array of first values and the second code comprises a second array of second values, wherein each first value has a one-to-one correspondence with a single second value, and wherein the comparison value is incompatible with the second code if a portion of the comparison value derived from any particular first value is incompatible with the second value that corresponds with the particular first value.

5. A data storage device according to claim 1 wherein the comparison value is incompatible with the second code if the comparison value is not substantially similar to the second code.

6. A data storage device according to claim 1 wherein the portion of the data storage region of the data storage device comprises substantially all of the data storage region of the data storage device.

7. A data storage device according to claim 1 wherein if the comparison value is incompatible with the second code, the controller is further adapted to deny existence of the portion of the data storage region of the data storage device.

8. A data storage device according to claim 1 wherein the controller is further adapted to count the number of times the controller compares the comparison value with the second code, and to restrict access to the portion of the data storage region of the data storage device if the count exceeds a preset limit.

9. A data storage device according to claim 1 wherein the controller is further adapted to restrict access to the portion of the data storage region upon disconnection of the device from the external system.

10. A data storage device according to claim 1 wherein the data storage device comprises a disk drive.

11. A data storage device according to claim 10 wherein the disk drive is adapted to operate on a specific computer, and wherein the controller is adapted to restrict access to the portion of the data storage region of the data storage device upon removal of the disk drive from the specific computer.

12. A computer system comprising:
   (a) a data storage device having a key storage area adapted to store a first code and a second code, a data storage region to receive and store data, and a controller; and
   (b) a master module comprising program code to retrieve the first code from the data storage device and program code to generate a comparison value from the first code;
   wherein the controller is adapted to receive the comparison value from the master module and to compare the comparison value to the second code and to restrict access to a portion of the data storage region of the data storage device if the comparison value is incompatible with the second code.

13. A computer system according to claim 12 wherein the key storage area, the master module or both is inaccessible to an unauthorized operator.

14. A computer system according to claim 12 wherein the master module comprises an identifier code that is used in a one-way function adapted to generate the comparison value from the first code.

15. A computer system according to claim 12 wherein the data storage device comprises a disk drive.

16. A computer system according to claim 12 wherein the first code comprises a first array of first values and the second code comprises a second array of second values, wherein each first value has a one-to-one correspondence with a single second value, and wherein the comparison value is incompatible with the second code if a portion of the comparison value derived from any particular first value is incompatible with the second value that corresponds with the particular first value.

17. A computer system according to claim 12 wherein the portion of the data storage region of the data storage device comprises substantially all of the data storage region of the data storage device.

18. A method of restricting the access of a computer to a portion of a data storage region of a data storage device, the method comprising the steps of:
  (a) transferring a first code and a second code to the data storage device;
  (b) transferring the first code from the data storage device to the computer;
  (c) processing the first code in the computer to generate a comparison value;
  (d) transferring the comparison value from the computer to the data storage device;
  (e) comparing the comparison value with the second code in the data storage device; and
  (f) restricting access of the computer to the portion of the data storage region of the data storage device if the comparison value and the second code are incompatible.

19. A method according to claim 18 wherein the first code is processed to generate the second code using a one-way function, and optionally an identifier code.

20. A method according to claim 18 wherein the first code is processed to generate the comparison value using a one-way function, and optionally an identifier code.

21. A method according to claim 20 wherein either one or both of the one-way function or the identifier code is maintained inaccessible to an unauthorized operator.

22. A method according to claim 18 wherein the first code comprises a first array of first values and the second code comprises a second array of second values, wherein each first value has a one-to-one correspondence with a single second value, and wherein the comparison value is incompatible with the second code if a portion of the comparison value derived from any particular first value is incompatible with the second value that corresponds with the particular first value.

23. A method according to claim 18 wherein the first code is processed to generate the second code using a one-way function, and the first code is processed to generate the comparison value using the one-way function.

24. A method according to claim 18 wherein the comparison value is incompatible with the second code if the comparison value is not substantially alike to the second code.

25. A method according to claim 18 wherein the portion of the data storage region of the data storage device comprises substantially all of the data storage region of the data storage device.

26. A method of restricting access to a portion of a data storage region of a data storage device, the method comprising the steps of:
  (a) generating a second code from a first code and storing the first and second codes in the data storage device;
  (b) comparing a comparison value, generated by an external system in response to retrieving the first code from the data storage device, with the second code; and
  (c) restricting access to the portion of the data storage region of the data storage device if the comparison value is incompatible with the second code.

27. A method according to claim 26 wherein the second code is generated from the first code by a one-way function, and optionally an identifier code.

28. A method according to claim 27 wherein one or more of the one-way function and identifier code is maintained inaccessible to an unauthorized operator.

29. A method according to claim 26 wherein one or more of the first and second codes is encrypted.

30. A method according to claim 26 wherein the data storage device comprises a disk drive.

31. A method according to claim 26 wherein at least one of the first code or second code is maintained unreadable by an unauthorized operator.

32. A method according to claim 26 wherein the first code is generated by a random number generator.

33. A method according to claim 26 wherein comparing the comparison value with the second code is performed when the data storage device is started.

34. A method according to claim 26 further comprising denying the existence of the inaccessible portion of the data storage region of the data storage device.

35. A method according to claim 26 wherein comparing the comparison value with the second code is performed when the data storage device is disconnected from the external system and connected to another external system.

36. In a computer system including a computer and a data storage device, wherein the computer includes a master module, and the data storage device includes a controller, a data storage region and a key storage area, a method of restricting access of the computer to a portion of the data storage region, the method comprising the steps of:
  providing a first code and a second code in the key storage area;
  sending the first code from the key storage area to the master module;
  computing a comparison value in the master module in response to the first code;
  sending the comparison value from the master module to the controller; and
  comparing the comparison value to the second code in the controller, wherein the controller restricts access of the computer to the portion of the data storage region if the comparing indicates that the comparison value and the second code are incompatible, and the controller permits access of the computer to the portion of the data storage region if the comparing indicates that the comparison value and the second code are compatible.

37. A method according to claim 36, wherein providing the first code and the second codes includes generating the first code and the second code in the computer, and sending the first code and the second code from the computer to the key storage area.

38. A method according to claim 37, wherein providing the first code includes creating the first code using a random number generator.

39. A method according to claim 37, wherein generating the second code includes computing the second code in response to the first code.

40. A method according to claim 39, wherein computing the second code includes processing the first code using a one-way function, and computing the comparison value includes processing the first code using the one-way function.

41. A method according to claim 40, wherein the one-way function is specifically assigned to and unique to the computer.

42. A method according to claim 40, wherein computing the second code includes processing the first code using the one-way function and an identifier code, and computing the comparison value includes processing the first code using the one-way function and the identifier code.

43. A method according to claim 42, wherein the identifier code is specifically assigned to and unique to the computer.

44. A method according to claim 42, wherein the identifier code is specifically assigned to and unique to an owner of the computer.

45. A method according to claim 42, wherein the identifier code is specifically assigned to and unique to an OEM.

46. A method according to claim 42, wherein the identifier code is created using a random number generator in the computer.

47. A method according to claim 36, wherein providing the first code and the second code includes providing a plurality of first codes and a corresponding plurality of second codes as matched pairs in the key storage region, sending the first code includes selecting the first code from the plurality of first codes, and comparing the comparison value includes selecting the second code from the plurality of second codes.

48. A method according to claim 47, wherein selecting the first code includes randomly selecting the first code from the plurality of first codes.

49. A method according to claim 36, wherein sending the first code occurs upon start-up of the data storage device.

50. A method according to claim 36, wherein computing the comparison value includes processing the first code using a one-way function.

51. A method according to claim 50, wherein the one-way function is specifically assigned to and unique to the computer.

52. A method according to claim 50, wherein computing the comparison value includes processing the first code using the one-way function and an identifier code.

53. A method according to claim 52, wherein the identifier code is specifically assigned to and unique to the computer.

54. A method according to claim 52, wherein the identifier code is specifically assigned to and unique to an owner of the computer.

55. A method according to claim 52, wherein the identifier code is specifically assigned to and unique to an OEM.

56. A method according to claim 52, wherein the identifier code is created using a random number generator in the computer.

57. A method according to claim 36, wherein the controller permits access to the portion of the data storage region by the computer if the key storage area does not include the first code and the second code.

58. A method according to claim 36, wherein the controller permits access of the computer to a remaining portion of the data storage region if the controller restricts access of the computer to the portion of the data storage region by the computer.

59. A method according to claim 36, wherein the controller denies the existence of the portion of the data storage region to the computer if the controller restricts access of the computer to the portion of the data storage region.

60. A method according to claim 36, wherein the controller disables the data storage device until the data storage device is reset if the comparing is performed more times than a preset limit.

61. A method according to claim 36, wherein the controller restricts access of the computer to the key storage area.

62. A method according to claim 36, wherein the controller restricts access of an unauthorized user to the key storage area.

63. A method according to claim 36, wherein the computer restricts access of the data storage device to the master module.

64. A method according to claim 36, wherein the computer restricts access of an unauthorized user to the master module.

65. A method according to claim 36, wherein the data storage device includes a disk, and the disk includes the data storage region and the key storage area.

66. A method according to claim 36, wherein the data storage device includes a disk and a chip, the disk includes the data storage region and the chip includes the key storage area.

67. A method according to claim 36, wherein the portion of the data storage region is substantially all of the data storage region.

68. A method according to claim 36, wherein the data storage region is larger than the key storage area.

69. A method according to claim 36, wherein the first code is 8 to 16 bytes and the second code is 8 to 16 bytes.

70. A method according to claim 36, wherein the first code is among a plurality of at least 64 first codes, the second code is among a corresponding plurality of at least 64 second codes, and the first codes and the second codes are matched pairs.

71. A method according to claim 36, wherein the computer includes a CPU, a RAM and an I/O controller card.

72. A method according to claim 71, wherein the computer includes a monitor, a keyboard and a mouse.

73. A method according to claim 36, wherein the data storage device is a disk drive, a tape drive or a flash card.

74. A method according to claim 73, wherein the data storage device is a disk drive.

75. A method according to claim 73, wherein the data storage device is a tape drive.

76. A method according to claim 73, wherein the data storage device is a flash card.

77. A method according to claim 36, wherein the computer and the data storage device are coupled together by an industry standard communications bus.

78. A method according to claim 77, wherein the communications bus is a SCSI bus.

79. A method according to claim 77, wherein the communications bus is an IDE/ATA bus.

80. A method according to claim 77, wherein the communications bus is a FireWire bus.

81. In a computer system including a computer, a disk drive and an industry standard communications bus, wherein the computer includes a master module, the disk drive includes a controller, a data storage region on a disk and a key storage area, and the communications bus provides a pathway through which the computer and the disk drive communicate with one another, a method of restricting access of the computer to a portion of the data storage region, the method comprising the steps of:

providing a first code and a second code in the key storage area;

sending the first code from the key storage area to the master module;

computing a comparison value in the master module using a one-way function in response to the first code;

sending the comparison value from the master module to the controller; and comparing the comparison value to the second code in the controller, wherein the controller restricts access of the computer to the portion of the data storage region if the comparing indicates that the comparison value and the second code are incompatible, and the controller permits access of the computer to the portion of the data storage region if the comparing indicates that the comparison value and the second code are compatible.

82. A method according to claim 81, wherein providing the first code and the second codes includes generating the first code in the computer, computing the second code in the computer using the one-way function in response to the first code, and sending the first code and the second code from the computer to the key storage area.

83. A method according to claim 82, wherein generating the first code includes creating the first code using a random number generator.

84. A method according to claim 81, wherein providing the first code and the second code includes providing a plurality of first codes and a corresponding plurality of second codes as matched pairs in the key storage region, sending the first code includes selecting the first code from the plurality of first codes, and comparing the comparison value includes selecting the second code from the plurality of second codes.

85. A method according to claim 84, wherein selecting the first code includes randomly selecting the first code from the plurality of first codes.

86. A method according to claim 81, wherein the data storage region is larger than the key storage area, and the portion of the data storage region is substantially all of the data storage region.

87. A method according to claim 81, wherein the controller permits access to the portion of the data storage region by the computer if the key storage area does not include the first code and the second code.

88. A method according to claim 81, wherein the controller permits access of the computer to a remaining portion of the data storage region if the controller restricts access of the computer to the portion of the data storage region by the computer.

89. A method according to claim 81, wherein the controller denies the existence of the portion of the data storage region to the computer if the controller restricts access of the computer to the portion of the data storage region.

90. A method according to claim 81, wherein the controller disables the data storage device until the data storage device is reset if the comparing is performed more times than a preset limit.

* * * * *